United States Patent [19]

Fukushima

[11] Patent Number: 5,131,090
[45] Date of Patent: Jul. 14, 1992

[54] WORD PROCESSOR WITH SIMPLIFIED CHARACTER TRAIN DESIGNATION FOR MODIFYING FONTS

[75] Inventor: Takayuki Fukushima, Fussa, Japan

[73] Assignee: Casio Computer Co., Ltd., Tokyo, Japan

[21] Appl. No.: 392,261

[22] Filed: Aug. 10, 1989

[30] Foreign Application Priority Data

Aug. 31, 1988 [JP] Japan ............... 63-113470[U]
Aug. 31, 1988 [JP] Japan ............... 63-214930

[51] Int. Cl.⁵ .............. G06F 3/02; G06F 3/023; G06F 12/04; G06F 15/40
[52] U.S. Cl. .............. 395/700; 364/225.6; 364/225.4; 364/225.8; 364/225.9; 364/236; 364/234; 364/235; 364/237.9; 364/252.6; 364/280.7; 364/286.1; 364/DIG. 1; 364/419
[58] Field of Search ... 364/200 MS File, 900 MS File, 364/419; 340/706; 400/76, 83, 63; 395/700

[56] References Cited

U.S. PATENT DOCUMENTS

| | | | |
|---|---|---|---|
| 3,767,020 | 10/1973 | Rowe | 400/124 |
| 4,412,232 | 10/1983 | Weber et al. | 400/29 |
| 4,416,558 | 11/1983 | McInroy et al. | 400/76 |
| 4,425,629 | 1/1984 | Gason et al. | 364/900 |
| 4,437,156 | 3/1984 | Christopher et al. | 364/200 |
| 4,523,235 | 6/1985 | Rajchman | 400/29 |
| 4,686,649 | 8/1987 | Rush et al. | 400/76 |
| 4,725,158 | 2/1988 | Ueda et al. | 400/76 |
| 4,775,953 | 10/1988 | Goettelmann et al. | 364/900 |
| 4,831,583 | 5/1989 | Pascoe | 364/700 |
| 4,861,175 | 8/1989 | Hori et al. | 400/76 |
| 4,881,197 | 11/1989 | Fischer | 364/900 |
| 4,915,027 | 4/1990 | Ishibashi et al. | 400/29 |
| 4,937,036 | 6/1990 | Beard et al. | 340/706 |

FOREIGN PATENT DOCUMENTS

| | | |
|---|---|---|
| 0138444 | 4/1985 | European Pat. Off. |
| 61-29563 | 2/1986 | Japan |
| 61-64469 | 4/1986 | Japan |
| 61-154871 | 7/1986 | Japan |
| 61-286172 | 12/1986 | Japan |
| 62-27161 | 2/1987 | Japan |
| 62-116172 | 5/1987 | Japan |

OTHER PUBLICATIONS

Japanese Patent Disclosure (Tokkai Sho) vol. 8, No. 274, Dec. 14, 1984.
IBM Technical Disclosure (Tokkai Sho), vol. 17, No. 2, Jul. 1974.

*Primary Examiner*—Thomas C. Lee
*Assistant Examiner*—Daniel Pan
*Attorney, Agent, or Firm*—Frishauf, Holtz, Goodman & Woodward

[57] ABSTRACT

In a word processing apparatus, the input characters can be printed in various printing forms such as an inclined character, a void character and a shadow character. The word processing apparatus properly divides the input character train into a plurality of subdivided character trains, and also designates the printing forms for these subdivided character trains. The housing of the word processing apparatus is manually swept across a print paper in contact thereto so as to print the characters. While the housing of the word processing apparatus is manually swept over a predetermined distance, one subdivided character train is printed out in the printing form in accordance with the designated printing form.

20 Claims, 6 Drawing Sheets

FIG. 6A
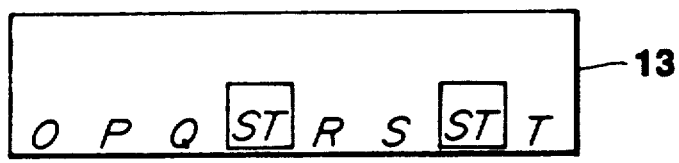
FIG. 6B
OPQ
FIG. 8A
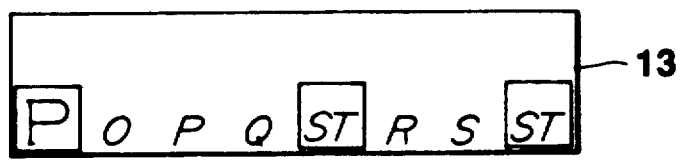
FIG. 7A
RS
FIG. 8B
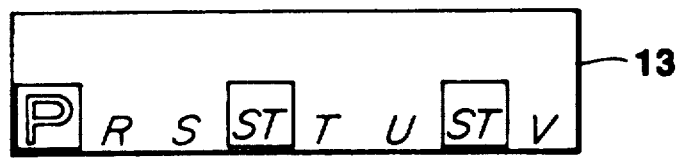
FIG. 7B
TU
FIG. 8C
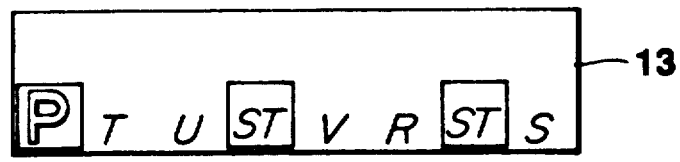
FIG. 7C
ST
FIG. 8D
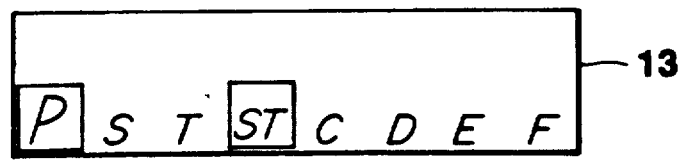
FIG. 7D

WORD PROCESSOR WITH SIMPLIFIED CHARACTER TRAIN DESIGNATION FOR MODIFYING FONTS

BACKGROUND OF THE INVENTION

1. Field of the Invention

The present invention generally relates to a word processor for processing document information which has been formed by a key entry operation, or the like, by way of editing and modifying operations, and for printing out the processed document information.

2. Description of the Related Art

Recently, a word processor has been widely and quickly utilized in a non-professional use market. In particular, a strong demand is made for such a word processor having a multiple function. In some of these word processors, the print characters of the formed documents can be modified into, for instance, a frame character, a shadow character, and an Italic character and then printed out on a printing medium.

In this case, the designation of the above-described character modification is carried out by firstly selecting a type of modification, and secondly designating the character train range of the characters to be modified with the starting and ending positions.

As a consequence, cumbersome selecting/designating operations of the characters to be modified are necessarily required. In particular, when the type of the modification is varied, a cumbersome designating operation is required every time the modification type is changed, which seriously encumbers a user of the word processor.

SUMMARY OF THE INVENTION

The present invention has been made in an attempt to solve the above-described problems of the conventional word processors, and therefore has an object to provide a compact word processor capable of readily modifying an arbitrary character train and printing out the modified character train when the formed document is character-modified without designating both sides of the modified range.

To achieve the above-described object of the present invention, a word processing apparatus comprises:
  an input device for inputting word data;
  a memory for storing said word data input from said input device;
  a segmenting device for segmenting a plurality of said word data stored in said memory, into a plurality of items containing at least one word data;
  a designator for designating a print-form of said word data contained in each item segmented by said segmenting device;
  a character-pattern generator for generating a character-pattern corresponding to said word data output from said memory and said print-form designated by said designator; and
  a printer for printing said character-pattern generated by said character-pattern generator.

With the above-described arrangements, the word processor according to the present invention can designate the character train to be modified in a simple operation. Similarly, according to the word processor of the invention, the changing of the characters to be modified can be performed with a simple operation.

BRIEF DESCRIPTION OF THE DRAWINGS

The above-described object and features of the invention will become apparent with reference to the following specification and to the drawings wherein:

FIGS. 6A and 6B schematically represent forming display conditions of the document data in the compact word processor shown in FIG. 1;

FIGS. 7A to 7D schematically illustrate character modification designating display conditions of the document data by the compact word processor shown in FIG. 1; and, FIGS. 8A to 8D represent printing conditions corresponding to the character modification designating display conditions shown in FIGS. 7A to 7D.

DETAILED DESCRIPTION OF THE PREFERRED EMBODIMENTS

CONSTRUCTION OF COMPACT WORD PROCESSOR

Figure 1:
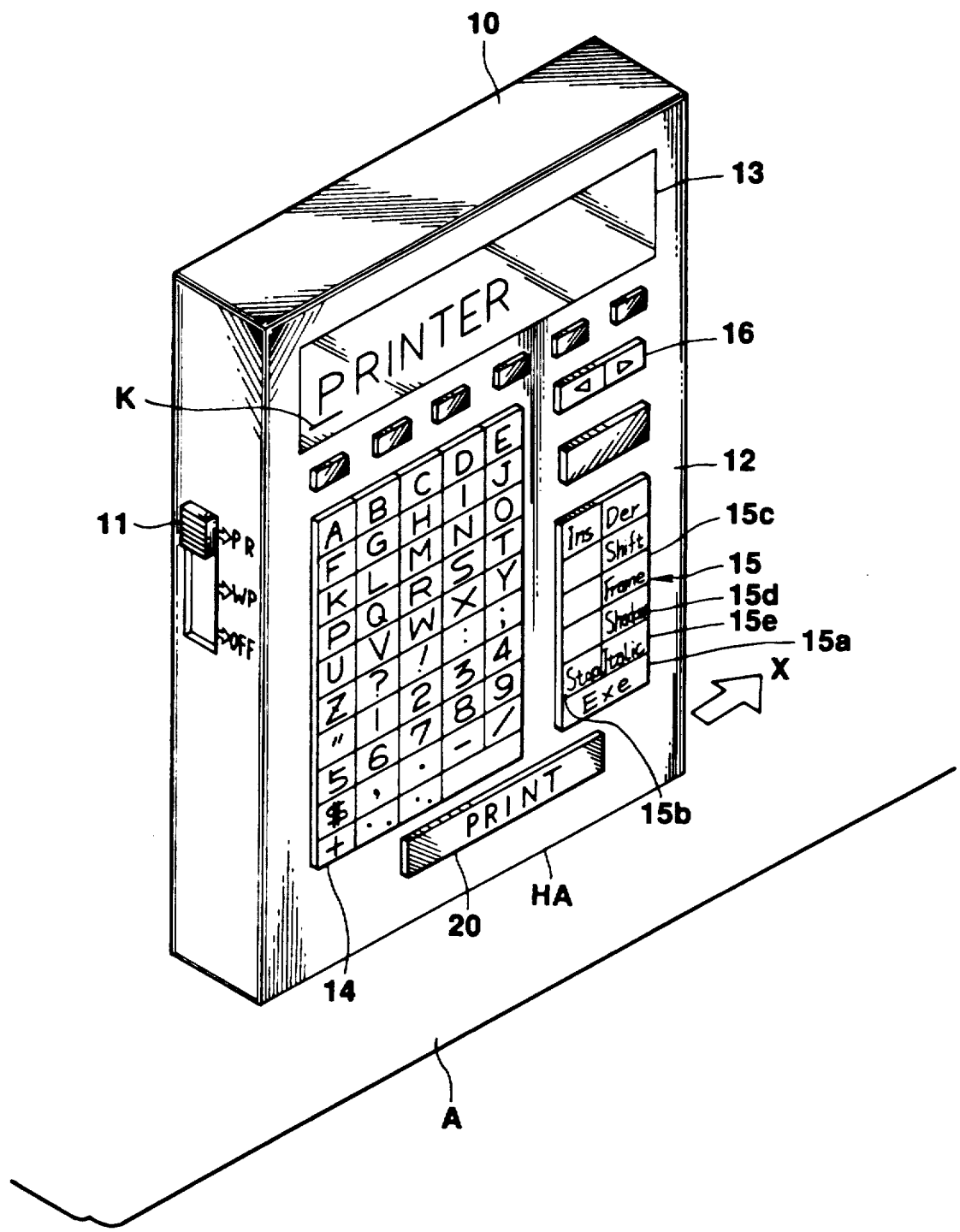
FIG. 1 is a perspective view of a compact word processor according to a first preferred embodiment of the invention.

In FIG. 1, there is shown a perspective view of a compact word processor according to a first preferred embodiment of the invention.

An apparatus housing 10 is so designed as to be manually held by one hand of an user. A mode changing switch 11 is mounted on the left side of the apparatus housing 10. Functions of this mode changing switch 11 are to turn ON/OFF a power source, and to select a document forming mode "WP" and a printing mode "PR". When either the document forming mode WP, or the printing mode "PR" is designated by operating the mode changing switch 11, the power source is turned ON. A key input unit 12 and a display unit 13 are provided on a front side of the apparatus housing 10. On the key input unit 12, there are provided a character/symbol input key 14, a function key 15, cursor 16, and a print key 20. It should be noted that the above-described display unit 13 is arranged by, for instance, 16 characters per line. A printing head unit "HA" is mounted on the lower side of the apparatus housing 10 in such a manner that a line type thermal head having, for example, 48 dots per line is directed with its line direction to a width direction of the apparatus housing 10.

The character/symbol input key 14 is used to input an alphabet or a number and a symbol, or the like in conjunction with the function key 15. As the function key 15, there are arranged an execution key 15a for instructing a function designated by other function keys 15; an insert key; a delete key, a stop key 15b for segmenting an input document at an arbitrary sentence (character train); a frame character key 15c for instructing a character modification of a document character train which has been segmented by the stop key 15b; a shadow character key 15d; an Italic character key 15e and the like for instructing various functions required for forming and printing the document by way of the above-described character/symbol input key 14. Then, the characters and symbols entered by the above-described character/symbol input key 14 and also the function key 15 are successively displayed on the above-described display unit 13. When the stop key 15b is operated so as to segment the document data which has been input by the character/symbol input key 14 into an arbitrary sentence (character train), a stop code is input and also a symbol "ST" is displayed on the display unit 13.

On the other hand, a function of a cursor key 16 is to move a cursor "K" in the horizontal direction of the display screen of the display unit 13, which is displayed together with the input document and symbols. By moving this cursor "K" on the display screen, an instruction of the input position and another instruction of a function range are performed. When the document formed by way of the key input operations is printed out on a recording medium "A", after the print mode "PR" has been instructed by manipulating the mode changing switch 11, the printer head unit "HA" is in contact with a surface of the recording medium "A" and the apparatus housing 10 is moved along a direction indicated by an arrow "X" while depressing a print key 20. As a result, the formed document is printed out on the recording medium "A".

In this case, while observing the formed document data displayed on the display unit 13, when the cursor key 16 is manipulated, the displayed screen is scrolled and the document character trains which have been arbitrarily subdivided by the stop code can be selected as data to be printed out. Then, the character modification of the document character train can be instructed by manipulating any one of these frame character key 15c, shadow character key 15d, and Italic character key 15e of the key input unit 12 at the stop code positions of the selected document character trains. In this case, at the stop code position where the character modification on the display unit 13 has been designated, a character modification recognition mark "P" representative of a sort of the character modification designated by this document character train is displayed instead of the stop code "ST".

During the printing operation of the above-described document data, on the other hand, when the stop code which is continued to the data to be printed out is read out from the memory, the printing operation is immediately stopped.

PRINTER UNIT OF WORD PROCESSOR

Figure 2:
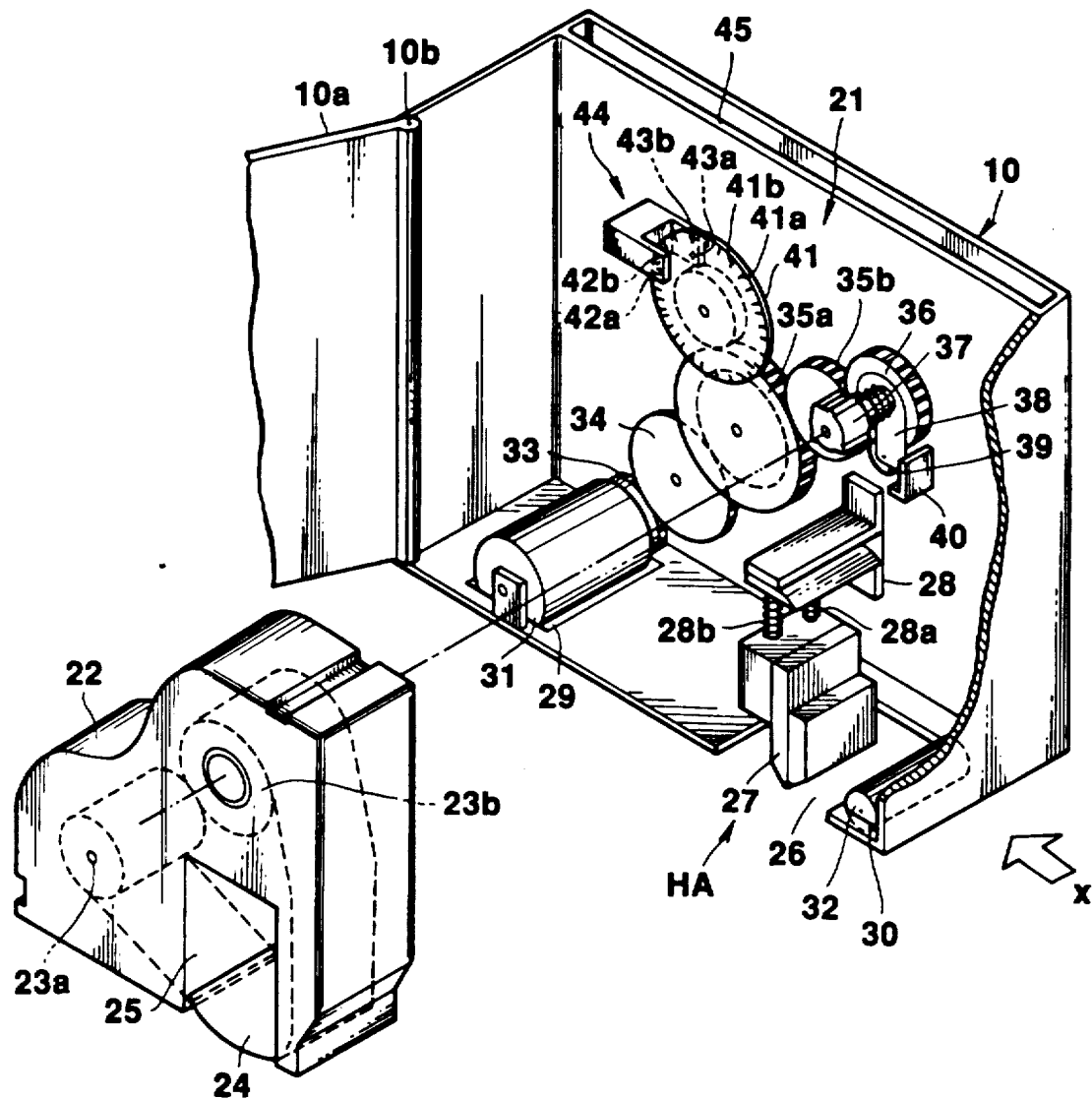
FIG. 2 is a perspective view of the printer unit of the compact word processor shown in FIG. 1.

In FIG. 2, there is shown a printer unit 21 constructed in the above-described word processor. In this drawing, an ink ribbon 22 is provided, and this ink ribbon 22 is detachably stored in higher precision within the apparatus housing 10 with respect to a center of the printer unit 21. Two ribbon spools 23a and 23b are employed in the ink ribbon cassette 22. One of these ribbon spools is a feeding spool, whereas the other is a take-up spool of a heat transfer ink ribbon 24. The heat transfer ink ribbon 24 is set to a lower end portion of the ribbon cassette 22 in such a manner that one portion of the heat transfer ink ribbon 24 is exposed from a notch 25 for positioning a head. A notch 26 for mounting a ribbon is formed in the printing head unit HA of the above-described printer unit 21. A thermal head 27 is positioned at a central portion of this notch 26 in such a way that a head surface thereof is slightly projected from the lower surface of the apparatus body 10. The thermal head 27 is slidably mounted in the vertical direction on a pair of slide stays 28a and 28b which are vertically mounted on a head mounting member 28. A printing force is continuously maintained in the lower direction by a force of a spring wound on these slide stays 28a and 28b in one body. Furthermore, at the side of the lower surface of the apparatus body 10 where the thermal head 27 has been positioned, two openings 29 and 30 having small and large sizes are formed on both sides of the above-described ribbon mounting notch 26. Two rubber rollers 31 and 32 are arranged on these openings 29 and 30. When the printer housing 10 is transferred or moved (i.e., swept) in a direction denoted by the arrow X in FIG. 2, these rubber rollers 31 and 32 rotate in contact with the recording medium "A" in response to the movement of the printer housing 10. A gear 33 rotated by one rubber roller 31 is coaxially mounted on roller 31. A diameter of this gear 33 is made smaller than that of the rubber roller 31, and the gear 33 is meshed with a take-up gear 36 via gears 34, 35a and 35b. A ribbon take-up shaft 37 is coaxially formed on this take-up gear 36. A stopper arm 38 which is forcibly depressed against the take-up gear 36 is mounted on a base portion of this take-up shaft 37. This stopper arm 38 is rotatable in the same rotation direction as the gear 36 by way of the pressure force exerted between the take-up gear 36 and this stopper arm 38. A stopper gear 39 meshed with the take-up gear 36 is mounted on the tip portion of this arm 38. Also an arm stopper 40 is provided in the rotation direction of the arm 38 corresponding to the rotation direction of the take-up shaft 36. When the take-up gear 36 is rotated in the ribbon take-up direction (i.e., normal direction), the stopper arm 38 is rotated until the arm stopper 40 and stopped there. Conversely, when the take-up gear 36 is rotated in the reverse direction with respect to the take-up direction, the stopper arm 38 is rotated until the tip portion thereof, i.e., stopper gear 39 is meshed with the gear 35b and stopped there. In other words, a reverse rotation blocking mechanism is eventually arranged by the above-described gears 35b, 36, stopper arm 38, stopper gear 39 and arm stopper 40.

An encoder disk 41 is coupled to the above-described described gear 35a. It should be noted that the rotation torque of the rubber roller 31 is transferred to ribbon take-up shaft 37 and encoder disk 41. A plurality of slits 41a, 41b,—, are formed in a radial direction of the encoder disk 41 in the encoder disk 41 with maintaining a predetermined interval. A pair of light emitting diodes (referred to as an "LED") 42a and 42b, and another pair of photosensors 43a and 43b are arranged at two sets of opposite positions for sandwiching the slit forming portion of this encoder disk 41. In this case, each of the light projected from these LEDs 42a and 42b is incident through plural slits 41a and 41b of the encoder disk 41 to the corresponding photosensors 43a and 43b. When the encoder disk 41 is rotated in the normal direction by moving the apparatus housing 10 along the X-direction, the light projected from LED 42a and 42b is successively incident upon the photosensors 43a and 43b in this order. Conversely, when the encoder disk 41 is rotated in the reverse direction, the light projected from LED 42a and 42b is successively incident upon the photosensors 43b and 43a in this order. It should be understood that an encoder 44 is arranged by the above-described encoder disk 41, LEDs 42a, 42b, photosensors 43a and 43b and the like. The ink ribbon cassette 22 is mounted to this printing unit 21 as the ribbon take-up shaft 37 being a supporting shaft. In this case, the heat transfer ink ribbon 24, a portion of which is exposed from a range of the lower portion of the ribbon cassette 22, is set in such a manner that this ink ribbon 24 is in contact with the head surface of the thermal head 27 mounted on the notch 26 formed in the apparatus housing 10, by which the ribbon is mounted. It should be noted that a rear cover 10a of the apparatus housing 10 is so constructed by a hinge 10b under open and close conditions, by which a used ink ribbon cassette 22 can be readily replaced by a new ink ribbon cassette, and an inside check can also be carried out. On the other hand, a printed circuit board 45 is arranged between the printing unit 21 and apparatus housing 10. The keys and switches shown in FIG. 1, the encoder 44 of the printing unit 21, and the thermal head 27 are electrically connected to the printed circuit board 45.

CIRCUIT ARRANGEMENT

Figure 3:
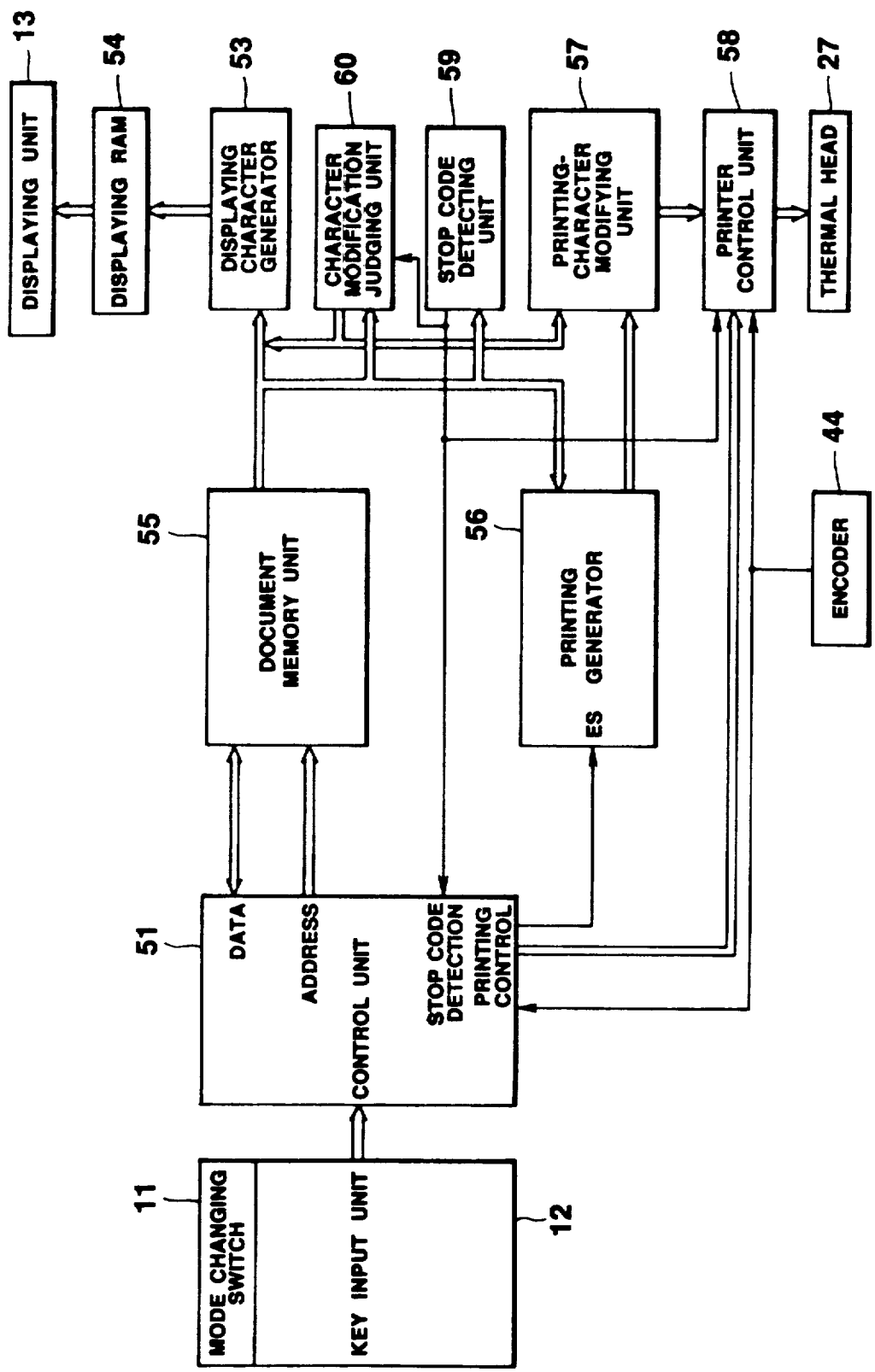
FIG. 3 is a schematic block diagram of an electronic circuit of the compact word processor shown in FIG. 1.

FIG. 3 shows a circuit arrangement of an electronic circuit formed on the printed circuit board 45.

A control unit 51 is employed to receive the mode changing signal derived from the mode changing switch 11, various key input signals from the key input unit 12, and pulse signals, i.e., a signal for detecting a drive (travel) amount of the apparatus housing 10 derived from the encoder 44. In response to the various key operation signals derived from the mode changing switch 11 and key input unit 12, the control unit 51 controls various devices connected thereto.

A document memory unit 55 is employed so as to store document information, or data which have been formed by operating the key input unit 12.

While a certain document is entered into the word processor according to the invention, the stop code is used every time the stop key 15b is operated for arbitrary sentences. Thus the stop codes are stored in connection with the character code of the document data in the above-described document memory unit 52.

Then, both the respective characters of the document data and symbol data which have been stored in the document memory unit 56 are output via a displaying character generator 53 and displaying RAM 54 to a display unit 13 and displayed thereon. Also, these data are called as actual character generator 56, and similarly output via a printing character modifying unit 57 to a printer control unit 58. To this printer control unit 58, a printer control signal is output from the control unit 51, and also the encoder pulses derived from the encoder 44 are input. In response to the printer control signal and encoder pulses, the character data which have been input via the printing character modifying unit 57 are transferred in one line unit to a thermal head 27 so as to heat-drive the thermal head 27. In this case, since the printing quality achieved by the thermal head 27 is determined by, for instance, 24 × 24 dots per character (full angle), the above-described 1 line implies to have 1/24 patterns of one character.

The document data to be printed out which is read from the document memory unit 55, is also supplied to a stop code detecting unit 59 and character modification judging unit 60. The function of the stop code judging unit 59 is to detect that the above-described stop code has been read out while reading out the document data character code from the document memory unit 55 in the print mode "PR". The stop code detecting signal is output to the control unit 51, printer control unit 58, and character modification judging unit 60. In case that the word processor is not under the printing operation when the stop code detecting signal is output, the content of the character modification code which is stored together with the stop code while the character modification is instructed, is judged by the character modification judging unit 60. It should be noted that the corresponding stop code mark on the display unit 13 is converted into a "P" mark corresponding to the content of the character modification. Then, the character data which is read out from the document memory unit 55 in conjunction with the later printing operation, is modified under the character modification mode by the printing-character modifying unit 57 and supplied to the printer control unit 58 and thermal head 27 for printing out the modified character on the recording medium. On the other hand, the detection of the stop code, designation of the readout address with respect to the document memory unit 55, and printer drive control of the thermal head 27 by the printer control unit 58 are interrupted during the printing operation.

DATA ARRANGEMENTS

Figure 4A:
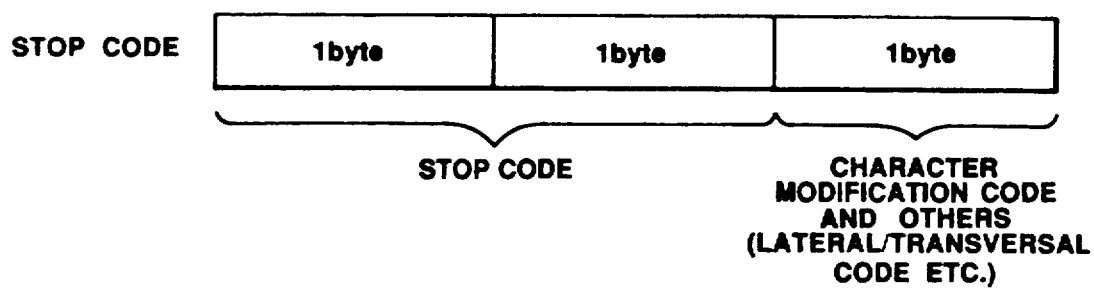
FIGS. 4A and 4B are illustrations for explaining a stop code data arrangement and a head address data arrangement employed in the sentence memory unit of the compact word processor shown in FIG. 1.
Figure 4B:
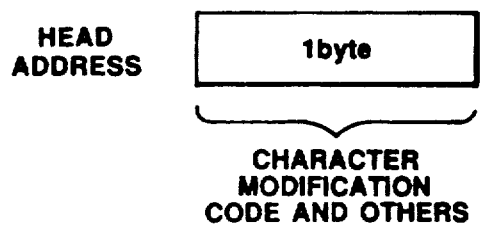

In FIGS. 4A and 4B, there are shown data arrangements of the above-described stop code and head address. Each of these character codes and stop codes in the document memory unit 55 is arranged by 3 bytes. Precisely speaking, the stop code is stored in the heading 2 bytes and the character modification code as well as other modification codes are stored in the remaining 1 byte. The character modification code contains the frame characters, shadow characters, and Italic characters. The head address of the document memory 55 is arranged by 1 byte because no character code is present. The character modification code and the like corresponding to the final byte of the above-described stop code are stored in the head address of the document memory unit 55. That is, in the character code train which has been segmented by the stop code contained in the document data in accordance with the content of the heading stop code thereof, the character modification and the like corresponding to the content of the heading stop code are managed, whereas in the character code train corresponding to the heading sentence of the document data, the character modification and the like are managed based upon the content of the heading address in the document memory unit 55. It should be noted that the character modification code is stored in the memory area shown in FIG. 4 by selecting an arbitrary sentence character train contained in the document data, and also key-input-designating any one of the frame character, shadow character and Italic character at the heading stop code position. Also, the stop code used by instructing the character modification is output from the displaying character generator 53 as a "P" mark corresponding to the contents of the character modification, and then displayed on the display unit 13.

WORD PROCESSING BY COMPACT WORD PROCESSOR

A word processing operating by the compact word processor with the above-described arrangement will now be described with reference to the drawings.

When the desired document is formed, the mode changing switch 11 is manipulated to designate the document forming mode. WP. Thus, the control unit 51 is set to the document forming mode "WP". Thereafter, a user manually operates the key input unit 12 in order to sequentially input desirable characters, symbols and so on.

At first, when the character/symbol input key 14 and function key 15 are operated so as to key-enter the desirable document data, the entered document data are successively transferred via the control unit 51 to the document memory unit 55. At this time, when the stop key 15b is operated at the proper timings while entering the document data, the entered document can be segmented every arbitrary sentences. Then, the entered document data are sequentially displayed via the displaying character generator 53 and displaying RAM 54.

As a consequence, predetermined segmenting codes, i.e., the above described stop codes are written into the formed document data which is stored in the document memory unit 55 at predetermined positions corresponding to the input positions by the stop key 15b operations which 15 are performed so as to segment the input document into the arbitrary sentences. It should be noted that this "stop code" corresponds to data used for judging the head position of the sentence character train, the character modification designated for this character train, and the end position of this sentence character train when the formed document data is printed out.

PRINTING OPERATION

Then, the document data which has been entered by operating the key input unit 12, is printed out as follows.

When the document data which has been formed in the above-described document forming method is printed out on the recording medium, the mode changing switch 11 is changed into the printing mode "PR" (see FIG. 1). Thus, the control unit 51 is set to the print mode in response to the changing operation of this mode changing switch 11, the document memory unit 55 is brought into the readout condition, and the printer control unit 58 is under encoder pulse receiving condition. Under these conditions, a user makes the printer head unit HA in contact with the recording medium "A", as illustrated in FIG. 1, and moves the apparatus housing 10 along the arrow direction "X" while depressing the print key 20. While the apparatus housing 10 is moved, the rubber rollers 31 and 32 are rotated so that the rotation forces thereof are transferred to the gears 34, 35a and 35b as shown in FIG. 2. Then, the encoder disk 41 is rotated in accordance with the rotations of this intermediate gear 35a. As a result, while the encoder disk 41 is rotated, the light emitted from the respective LEDs 42a and 42b is transferred and interrupted via the slits 41a and 41b to the corresponding photosensors 43a and 43b, respectively. In this case, when the apparatus housing 10 is moved in the X-direction, the encoder disk 41 is rotated in the above-defined normal condition, so that the pulse signal output from the photosensor 43a is an output from the encoder 41. This output signal is sent as a signal for detecting a travel amount of the apparatus housing 10 to the control unit 51 and printer control unit 58. The rotation torque of the other rubber roller 31 is transferred to the take-up gear 36 and ribbon take-up shaft 36. Furthermore, this rotation torque is transferred to the take-up spool 23b in the ink ribbon cassette 22. As a result, the ribbon take-up spool 23b is rotated thereby to take up the heat transfer ink ribbon 24 which is guided from the ribbon supply spool 23a via the notch 26 for mounting the ribbon. In this case, the ribbon take up shaft 37 is rotated, while the apparatus housing 10 is moved, in such a condition that this rotation is in accordance with a travel amount of the apparatus housing 10 not to produce a slip between the recording paper "A" and the ink ribbon 24. Also, the ink ribbon 24 is depressed in a light weight against the recording paper "A" by the thermal head 27 which holds the printing pressure in the lower direction continuously exerted by the slide staies 28a and 28b. When the apparatus housing 10 is moved along the X-direction for the printing purpose, the take-up gear 36 is rotated in the normal direction and thus the stopper arm 38 is held in contact with the arm stopper 40.

On the other hand, the above-described travel amount detecting signal which is derived as the encoder pulse from the photosensor 43a, is transferred as the output signal of the encoder 44 to the control unit 51 and printer control unit 58. As a result, the control unit 51 sequentially addressing the memory address of the document memory unit 55 in response to the travel amount detecting signal sent from the encoder 44, whereby the document data stored therein is read out. Then, the readout document data is output via the printing character generator, 56 and printing-character modification unit 57 as the individual character data, to the printer control unit 58. The printer control unit 58 drives the thermal head 27 in synchronism with the travel amount detecting signal derived from the encoder 44, namely the readout timing of the document data by the control unit 51. The document data is thermally transferred via the ink ribbon 24 to the recording paper "A" while driving the thermal head 27.

When, as represented in FIG. 6A, the document data "OPQR" which has been formed and displayed, is segmented into arbitrary sentences by utilizing the stop codes as illustrated in FIG. 6B, and the mode selecting switch is operated to set the print mode "PR", the heading sentence character train "OPQ" shown in FIG. 7A is selected as the data to be printed, and the "P" mark indicative of this sentence to be printed is displayed. Thereafter, when the above-described printing operation is carried out by moving the apparatus housing 10, and the stop code subsequent to the document data (in this case "OPQ") is read from the document memory unit 55, this printing operation is stopped since the stop code detecting signal is output from the stop code judging unit 59. At this time, as illustrated in FIG. 7B, the document data displayed on the display unit 13 is scrolled and thus, the succeeding sentence character train "RS" is under the selection as another document data to be printed out. As a result, as represented in FIG. 8A, the printing operations can be performed every time the entire document data are segmented into arbitrary numbers of the segmented sentences by employing the stop codes. If no character modification has been designated in the above-described character train "OPQ" to be printed out, the "P" mark represented in FIG. 7A is displayed in the normal character form. However, if the frame "P" mark is displayed at the head position of the next character train "RS" to be printed out, it can be recognized that the frame character modification has been instructed for this character train.

While the apparatus housing 10 is traveled, an unused ink ribbon portion of the ink ribbon 24 is fed out from the feedout spool 23a of the ink ribbon cassette 22.

Then, a used ink ribbon portion of the ink ribbon 24 which has been used in the heat transfer operation by the thermal head 27 is successively taken up by the take-up spool 23b. As previously described, while the apparatus housing 10 of the compact word processor 1 is moved along the X-direction, the formed document data which has been stored in the document memory unit 55 is successively printed out on the recording medium "A" at a unit of the segmented sentence character trains which have been subdivided by utilizing the stop codes. In this case, since the compact word processor itself is moved to perform the printing operation on the recording paper "A", such a printing operation can be freely performed without any limitation in the sizes of the recording mediums only under the condition that the minimum printing range available for the formed document data is required. For instance, the printing operation by the compact word processor may be effected on a sealed note book.

CHARACTER MODIFICATION JUDGEMENT

Figure 5:
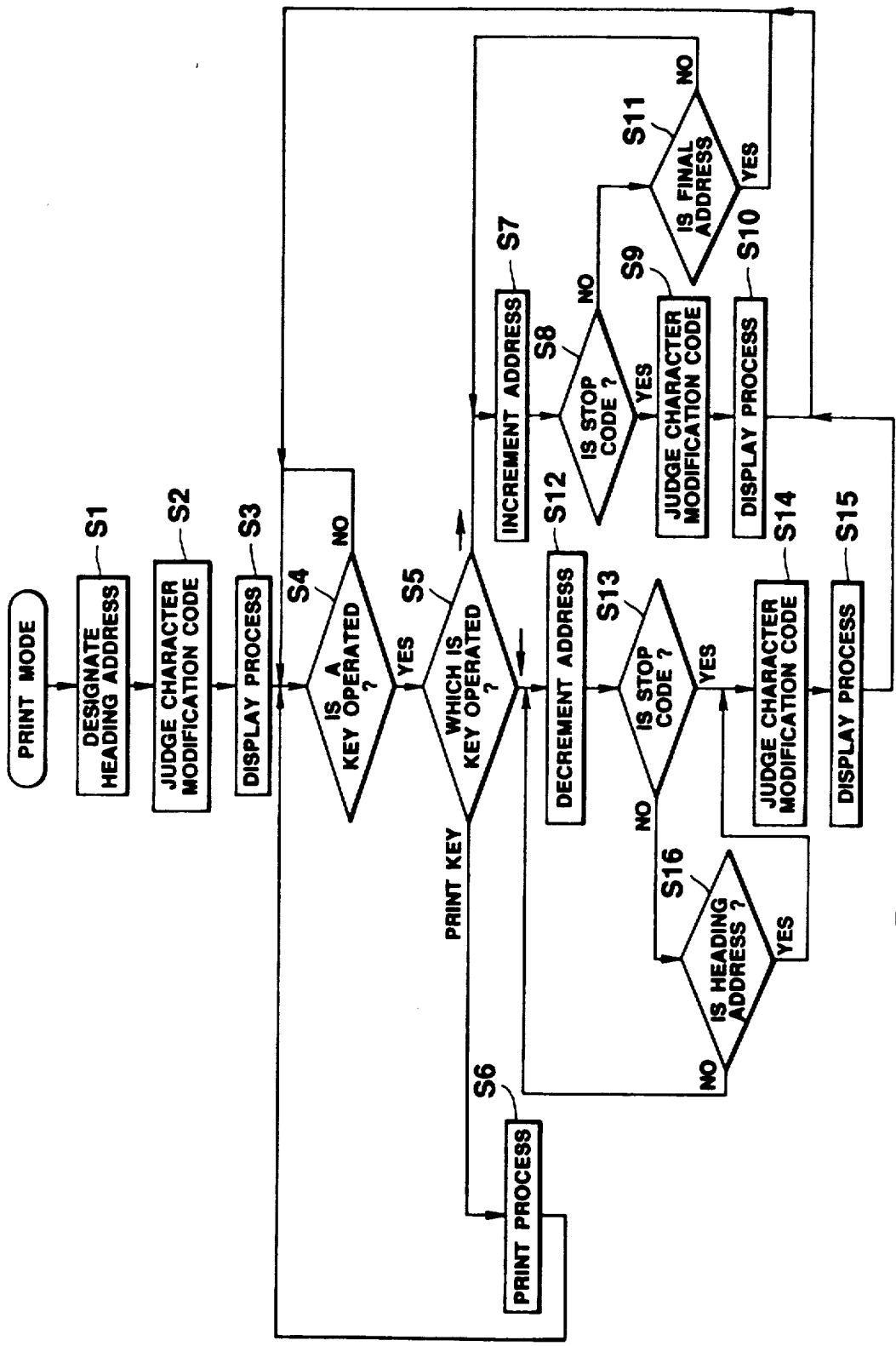
FIG. 5 is a flow chart for explaining a character modification judging process executed in conjunction with the printing operation of the compact word processor illustrated in FIG. 1.

Referring now to a flowchart shown in FIG. 5, the character modification judging process according to the preferred embodiment will be described which is performed in conjunction with the above-described printing operation.

It is assumed in the preferred embodiment that the document data which have been stored in the document memory unit 55 are, for instance, "OPQ"-stop-"RS"-stop-"TV"-stop-"VR"-stop-"ST"-stop-"CDE . . . ".

First, after the above-described document data have been formed, the mode changing switch 11 is operated to set the operation mode to the printing mode PR. Thus, the head address (see FIG. 4B) of the document memory unit 55 is designated by the control unit 51 and the code content of the character modification which has been stored at this head address is judged in the character modification judging unit 60 (steps S1 and S2). In this case, if no character modification is designated in the character train "OPQ" of the head sentence data stored in the document memory unit 55, as represented in FIG. 7A, the "P" mark for indicating that this sentence should be printed out in the normal font is displayed (step S3). When the print key 20 is operated and the apparatus housing 10 is moved over the recording paper "A", the above-described character train "OPQ" data of the segmented sentence is successively read from the document memory unit 55, as represented in FIG. 8A, and thereafter supplied via the printing character generator 56, printing character modifying unit 57, and printer control unit 58 to the thermal head 27 for performing the printing operation (steps S4 to S6). In this case, as shown in FIG. 7B, the document data displayed on the display unit 13 are scrolled so that the subsequent character train "RS" has been selected as the data to be printed out. Under this condition, the presence of the character modification code, as shown in FIG. 7A, contained in the head stop code of the above-described data "RS" to be printed is judged by the character modification judging unit 60, and the "P" mark indicative of the frame character modification is displayed. When this character train designated in the frame form is printed out, the print condition is represented in FIG. 8B.

Thereafter, when the cursor key (→) 16 is operated so as to select another character train to be printed out, the read address for the document memory unit 55 is incremented, and also the document displayed on the display unit 13 is scrolled (steps S4, S5 to S7). Under these circumstances, when the stop code positioned just before the segmented sentence "TV" subsequent to the above-described document data "RS" is read out from the document memory unit 55, the readout operation of this stop code is detected by the stop code judging unit 59 and furthermore, the character modification code contained therein is judged by the character modification judging unit 60 (steps S8 and S9). At this time, as illustrated in FIG. 7C, the document data displayed on the display unit 13 is scrolled, and the "P" mark representing that the requirement on the shadow character modification is judged by the character modification judging unit 60 is displayed (step s10). Under this condition when the print key 20 is operated and the apparatus housing 10 is manually scanned over the recording paper "A" as previously explained, the character train "TV" of the subsequent segmented sentence is sequentially read out from the document memory unit 55, and then supplied from the printing character generator 56 via the printing-character modifying unit 57 to the thermal head 27 as the shadow characters for the printing purpose (steps S4 to S6). At this time, the document data displayed on the display unit 13 is scrolled to select the character train "VR" of the next segmented sentence as the data to be printed out. Furthermore, when the cursor key (→) 16 is manipulated, as illustrated in FIG. 4D, the data "ST" to be printed out is selected and the character modification code contained in the heading "stop" code is judged by the character modification judging unit 60, so that the "P" mark indicative of the Italic character modification is displayed on the display unit 13. Then, when the character train designated by the inclined character is printed out on the recording paper "A", the printed condition thereof is illustrated in FIG. 8D.

If no stop code is detected by the stop code judging unit 59 when the cursor key (→) 16 is operated, both the increment process on the readout address for the document memory unit 55 and the screen scrolling process for the display unit 13 are repeated until the final address of the document memory unit 55 (steps S4, S5 to S7, S8 to S11).

When the cursor key (←) 16 is operated so as to select again the character train to be printed under such a condition that the above-described character train of the segmented sentence "ST" is selected as the data to be printed out, the readout address used for the document memory unit 55 is decremented and accordingly, the document data displayed on the display unit 13 is scrolled in the reverse direction, i.e., from the screen bottom toward the screen top (steps S4, S5 to S12). When the stop code positioned just before the segmented sentence "TV" prior to the above-described document data "ST" is, for instance, read out from the document memory unit 55, the readout operation of this stop code is detected by the stop code judging unit 59 and the character modification code contained therein is judged by the character modification judging unit 60 (steps S13 and S14). As a result, as illustrated in FIG. 7C, the document data displayed on the display unit 13 is scrolled in the above-described reverse direction. Consequently, the "P" mark indicating the shadow character modification based upon the judgement by the character modification judging unit 60 is displayed on the display unit 13 (step S13).

It should be noted that in case that the stop code is not detected by the stop code judging unit 59 when the above-described cursor key (←) 16 is operated, both the decrement process of the readout address for the document memory unit 55, and the reverse scrolling process for the display unit 13 are repeated until the heading address of the document memory unit 55 (steps S12, S13 to S16). At this time, the screen condition of the display unit 13 is returned to the selection condition of the heading sentence "OPQ" of the document data as illustrated in FIG. 7A (steps S14 and S15).

As a consequence, in accordance with the above-described compact word processor having the above-mentioned mentioned arrangements, there is no limitation in the printing operation. For instance, document data can be freely printed on any kind of recording mediums, e.g., a recording paper having an irregular size and a sealed note book. In addition, there is a particular advantage that since the document data to be printed out are managed for each of the segmented sentence data by employing the insertions of the stop codes, the selection as well as the range designation of the character train can be readily performed which is processed in the character modification.

What is claimed is:

1. A word processing apparatus comprising:
   input means for inputting a plurality of word data;
   memory means for storing a plurality of said word data input from said input means;
   segmenting means for segmenting a plurality of said word data stored in said memory means, into a plurality of segmented items each corresponding to a printing area, each of said segmented items containing a plurality of word data;
   means for selecting a segmented item to be printed;
   designating means for designing a print form for the item, for thereby designating a print form for all of said word data contained in each respective item segmented by said segmented means and for which a print form is designated by said designating means, by only one operation of said designating means;
   character-pattern generating means for generating a character pattern corresponding to said word data output from said memory means and said print form for the corresponding item which is designated by said designating means;
   printing means for printing said character pattern generated by said character-pattern generating means, for all of said word data in the corresponding item, in the print form designated by said designating means; and
   print-stopping means for stopping printing of said character pattern when said printing means has printed said character pattern corresponding to all of said word data contained in each respective selected item.

2. A word processing apparatus of claim 1, wherein:
   said segmenting means includes means for generating a segment code; and
   said designating means includes means for generating a designating code corresponding to said designated print form,
   said word processing apparatus further comprising:
   control-data producing means for producing control data containing said segment code and said designating code and also for outputting said control data to said memory means so as to store said control data in front of first word data contained in an item stored in said memory means.

3. A word processing apparatus of claim 2, wherein said character-pattern generating means includes:
   judging means for judging said designating print form derived from said designating code of said control data output from said memory means;
   base-pattern generating means for generating a base pattern corresponding to said word data output from said memory means; and
   modifying means for modifying said base pattern generated by said base-pattern generating means, corresponding to said print form judged by said judging means.

4. A word processing apparatus of claim 3, wherein said print-stopping means includes:
   data output means for outputting said word data and said control data from said memory means;
   detecting means for detecting said segment code of said control data output from said memory means; and
   output control means for controlling an output operating of said data output means according to a result of said detecting means, so as to output said word data stored between two pieces of said control data in said memory means, from said memory means to said character-pattern generating means, whereby said printing means prints said character-pattern corresponding to said word data contained in each item at one print operation.

5. A word processing apparatus of claim 4, wherein:
   said judging means judges said designated print pattern from said designating code of the same control data in that said segmenting code detected by said detecting means is contained; and
   said modifying means modifies said base pattern generated by said base-pattern generating means corresponding to said word data output from said memory means, according to said print form judged by said judging means from said designating code of said control data which is output before said word data is output from said memory means.

6. A word processing apparatus of claim 5, further comprising:
   housing means including at least said printing means, and which is adapted to be manually swept across a printing medium; and
   position detecting means for detecting a position of said printing means relative to said printing medium while said housing means is manually swept across said printing medium, and for producing position-detecting signals every time said housing means is swept over a predetermined distance;
   whereby said printing means prints said character pattern in response to said position-detecting signals produced by said position detecting means.

7. A word processing apparatus of claim 2, further comprising:
   display means for displaying data;
   display control means for generating a character pattern corresponding to said word data stored in said memory means and a predetermined pattern corresponding to said control data stored in said memory means; and
   data supply means for supplying said character pattern and said predetermined pattern generated by said display control means to said display means.

8. A word processing apparatus of claim 7, wherein said display control means includes:

storing means for storing a plurality of predetermined characters which have different forms with respect to each other; and selecting means for selecting one of said predetermined characters having the form corresponding to said designating code of said control data.

9. A word processing apparatus of claim 1, further comprising:

housing means including at least said printing means, and which is adapted to be manually swept across a printing medium;

position detecting means for detecting a position of said printing means relative to said printing medium while said housing means is manually swept across said printing medium, and for producing a position detecting signal every time said housing means is manually swept over a predetermined distance; and printing control means for controlling a printing operation of said printing means in response to said position-detecting signal produced by said position detecting means.

10. A word processing apparatus of claim 9, wherein;

said segmenting means includes means for generating a segment code; and said designating means includes means for generating a designating code corresponding to said designated print form, said word processing apparatus further comprising:

control data producing means for producing control data containing said segment code and said designating code and for outputting said control data to said memory means, so as to store said control data in front of first word data contained in an item stored in said memory means.

11. A word processing apparatus of claim 10, wherein said character-pattern generating means includes:

judging means for judging said designated print form from said designating code of said control data output from said memory means; p1 base-pattern generating means for generating a base-pattern corresponding to said word data output from said memory means; and modifying means for modifying said base-pattern generated by said base-pattern generating means, corresponding to said print form judged by said judging means.

12. A word processing apparatus of claim 11, further comprising:

data output means for outputting said word data and said control data from said memory means;

detecting means for detecting said segment code of said control data output from said memory means; and output control means for controlling an output operation of said data output means according to a result of said detecting means, so as to output said word data stored between two control data in said memory means, from memory means to said character-pattern generating means, whereby said printing means prints said character-pattern corresponding to said word data contained in one item while said housing means is manually swept across said printing medium.

13. A word processing apparatus of claim 12, wherein:

said judging means judges said designated print pattern from said designated code of the same control data in that said segmenting code detected by said detecting means is contained; and said modifying means modifies said base-pattern generated by said base-pattern generating means corresponding to said word data output from said memory means according to said print form judged by said judging means from said designating code of control data which is output before said word data is output from said memory means.

14. A word processing apparatus of claim 1, wherein said printing means is a manually operated hand held printing means.

15. A word processing apparatus comprising:

input means for inputting word data;

memory means for storing said word data input from said input means;

segmenting means for segmenting a plurality of said word data stored in said memory means, into a plurality of items containing at least one word data, and for generating a segment code;

designating means for designating a print form for an item, for thereby designating a print form for all of said word data contained in each respective item segmented by said segmenting means and for which a print form is designating by said designating means, and for generating a designating code corresponding to said designating print form;

control-data producing means for producing control data containing said segment code and said designating code and also for outputting said control data to said memory means so as to store said control data in front of a first word data contained in said item in said memory means for which a print form is designated;

display means for displaying data;

display control means for generating a pattern of a character corresponding to word data of the item stored in said memory means for which a print form is designated to a predetermined pattern corresponding to said designating code of said control data stored in said memory means;

data supply means for supplying said pattern of a character and said predetermined pattern generated by said display control means to said display means for displaying the supplied character with said predetermined pattern corresponding to said designating code;

character-pattern generating means for generating a character pattern corresponding to said word data output from said memory means and said print form for the corresponding item which is designated by said designating means; and printing means for printing said character pattern generated by said character-pattern generating means.

16. A word processing apparatus of claim 15, wherein said display control means includes:

storing means for storing a plurality of predetermined characters which have respective different forms; and selecting means for selecting one of said predetermined characters having said form corresponding to said designating code of said control data.

17. A word processing apparatus of claim 15, wherein said character-pattern generating means includes:

judging means for judging said designated print form derived from said designating code of said control data output from said memory means;

base-pattern generating means for generating a base pattern corresponding to said word data of an item output from said memory means; and modifying means for modifying said base pattern generated by said base-pattern generating means, corresponding to said print form judged by said judging means.

18. A word processing apparatus of claim 17, further comprising:

data output means for outputting said word data and said control data from said memory means;

detecting means for detecting said segment code of said control data output from said memory means; and output control means for controlling an output operation of said data output means according to a result of said detecting means, so as to output said word data stored between two pieces of said control data in said memory means, from said memory means to said character-pattern generating means, whereby said printing means prints said character-pattern corresponding to said word data contained in each item at one print operation.

19. A word processing apparatus of claim 18, wherein:

said judging means includes means for judging said designated print pattern from said designating code of the same control data containing the segment code detected by said detecting means; and said modifying means includes means for modifying said base pattern generated by said base-pattern generating means corresponding to said word data of the item output from said memory means, according to said print-form judged by said judging means from said designating code of said control data which is output before said word data is output from said memory means.

20. A word processing apparatus of claim 15, wherein said printing means is a manually operated hand held printing means.

* * * * *

UNITED STATES PATENT AND TRADEMARK OFFICE
CERTIFICATE OF CORRECTION

PATENT NO. : 5,131,099
DATED : July 14, 1992
INVENTOR(S) : FUKUSHIMA, Takayuki It is certified that error appears in the above-identified patent and that said Letters Patent is hereby corrected as shown below:

Title page, item [56] References Cited. The class/subclass classification of U.S. patent No.4,831,583 (Pascoe):

Replace "364/700" with --364/900--.

Column 13, line 40 (claim 11):

Delete "p1".

Start "base-pattern" in a separate line.

Signed and Sealed this

Fifth Day of October, 1993

BRUCE LEHMAN

*Attest:*

*Attesting Officer*   *Commissioner of Patents and Trademarks*